(12) United States Patent
Kawamura (10) Patent No.: US 9,559,503 B2
(45) Date of Patent: Jan. 31, 2017

(54) ELECTRONIC COMPONENT UNIT

(71) Applicant: Yazaki Corporation, Tokyo (JP)

(72) Inventor: Yukihiro Kawamura, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 39 days.

(21) Appl. No.: 14/822,088

(22) Filed: Aug. 10, 2015

(65) Prior Publication Data

US 2016/0049779 A1 Feb. 18, 2016

(30) Foreign Application Priority Data

Aug. 12, 2014 (JP) ................................. 2014-164378

(51) Int. Cl.
 *H02G 3/08* (2006.01)
 *H02G 15/02* (2006.01)
 *H02G 3/18* (2006.01)

(52) U.S. Cl.
 CPC .............. *H02G 3/088* (2013.01); *H02G 3/081* (2013.01); *H02G 3/18* (2013.01); *H02G 15/02* (2013.01)

(58) Field of Classification Search
 CPC ..................................................... H02G 3/081
 See application file for complete search history.

(56) References Cited

U.S. PATENT DOCUMENTS

| | | | | |
|---|---|---|---|---|
| 6,231,370 B1 * | 5/2001 | Morin | .................... | H01R 12/57 361/807 |
| 2003/0077927 A1 * | 4/2003 | Momota | ................ | H01R 9/226 439/76.2 |
| 2003/0236008 A1 * | 12/2003 | Kita | .................... | H01R 13/6335 439/76.2 |
| 2004/0043645 A1 * | 3/2004 | Yamakawa | ............ | H01R 4/029 439/76.2 |
| 2005/0009384 A1 * | 1/2005 | Perhats, Sr. | .............. | H01R 4/48 439/76.1 |
| 2005/0208793 A1 * | 9/2005 | Takeuchi | ............. | H01R 13/518 439/76.2 |
| 2006/0205248 A1 * | 9/2006 | Cecconi | ................. | H01H 50/02 439/76.2 |

(Continued)

FOREIGN PATENT DOCUMENTS

JP 2014-082060 A 5/2014

*Primary Examiner* — Hung V Ngo
(74) *Attorney, Agent, or Firm* — Sughrue Mion, PLLC (57) ABSTRACT

An electronic component unit includes an electronic component including an electronic component main body, a holding member with a plate-shaped base holding the electronic component main body, and a terminal electrically connected to the electronic component main body; a housing member including a housing space that houses the electronic component with a first housing chamber for housing the electronic component main body and a second housing chamber for housing the terminal of the electronic component; and a counterpart terminal fitted to the second housing chamber and electrically connected to the terminal when the electronic component is housed in the housing space. The terminal is disposed inside of a virtual space formed by projecting the base in the inserting direction of the electronic component toward the housing space. The base is used as a lid to cover an opening of the housing space to which the electronic component is inserted.

6 Claims, 7 Drawing Sheets

(56) References Cited

U.S. PATENT DOCUMENTS

| | | | |
|---|---|---|---|
| 2013/0043971 A1* | 2/2013 | Chen | H01H 85/2045 337/205 |
| 2014/0106580 A1* | 4/2014 | Sato | B60R 16/0239 439/76.2 |
| 2014/0159837 A1* | 6/2014 | Hiraiwa | H01H 9/443 335/201 |

* cited by examiner

ELECTRONIC COMPONENT UNIT

CROSS-REFERENCE TO RELATED APPLICATIONS

The present application claims priority to and incorporates by reference the entire contents of Japanese Patent Application No. 2014-164378 filed in Japan on Aug. 12, 2014.

BACKGROUND OF THE INVENTION

1. Field of the Invention

The present invention relates to an electronic component unit.

2. Description of the Related Art

Conventionally, an electronic component unit is constituted of an electronic component, a housing member, and a counterpart terminal fitted to the housing member. In the electronic component unit, a terminal of the electronic component is electrically connected to a counterpart terminal of the housing member, by housing the electronic component into a housing chamber of the housing member. For example, Japanese Patent Application Laid-open No. 2014-082060 discloses a relay as an electronic component in which a terminal electrically connected to a relay main body in a case is exposed outside the case at the upper surface of the case, and the terminal is extended downward along the upper surface and the side surface of the case. An electronic component unit is configured by inserting the electronic component into a housing chamber of a housing member in the extending direction of the terminal.

Electronic component units are required to prevent foreign matters such as liquid and dust from entering therein, for example, to avoid a contact failure between the terminals. However, in the conventional electronic component units, not only a terminal of an electronic component, but also a connecting portion between the terminal and a counterpart terminal of a housing member are exposed outside. Accordingly, if foreign matters exist in the surroundings, there is a concern that a foreign matter may enter between the terminals.

SUMMARY OF THE INVENTION

In view of the foregoing, the present invention provides an electronic component unit that can prevent a foreign matter from entering between terminals.

It is an object of the present invention to at least partially solve the problems in the conventional technology.

The above object of the present invention is achieved by the following configurations.

According to one aspect of the present invention, an electronic component unit includes an electronic component including an electronic component main body, a holding member having a plate-shaped base which holds the electronic component main body, and a terminal which is electrically connected to the electronic component main body; a housing member including a housing space of the electronic component, the housing space having a main body housing chamber which houses the electronic component main body and a terminal housing chamber which houses a terminal of the electronic component; and a counterpart terminal which is fitted to the terminal housing chamber, and is electrically connected to the terminal when the electronic component is housed in the housing space. Here, the terminal is disposed inside of a virtual space provided by projecting the base in an inserting direction of the electronic component toward the housing space. The base is used as a lid to cover an opening of the housing space into which the electronic component is inserted.

According to another aspect of the present invention, the base covers a connecting portion between the terminal and the counterpart terminal as well as the counterpart terminal, when viewed in the inserting direction.

According to still another aspect of the present invention, the base holds the electronic component main body inside of the virtual space with the electronic component main body exposed.

According to still another aspect of the present invention, the electronic component includes a housing chamber which houses the electronic component main body with the terminal exposed, and a casing member which constitutes a case together with the holding member by assembling the casing member to the holding member.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of an electronic component unit according to the present invention will be described below with reference to the drawings. However, the invention is not limited to this embodiment.

Embodiment

An embodiment of an electronic component unit according to the present invention will be described with reference to FIGS. 1 to 8.

An electronic component unit according to the present invention is an electronic component assembly structure configured of an electronic component, a housing member in which the electronic component is housed, and a counterpart terminal fitted to the housing member and electrically connected to a terminal of the electronic component.

An electronic component used in the present invention includes an electronic component main body, a holding member that holds the electronic component main body, and an exposed terminal as an electrical connecting unit that is electrically connected to the electronic component main body. More specifically, the electronic component corresponds to a relay, a fuse, and the like.

A housing member used in the present invention includes at least one housing space for an electronic component. The housing space includes a main body housing chamber that houses an electronic component main body and a terminal housing chamber that houses a terminal of an electronic component. An electrical connecting unit is attached to the housing member. The electrical connecting unit of the housing member is a component (counterpart terminal) that establishes electrical connection with each other, by engaging with a terminal of the electronic component with the electronic component housed in the housing space. The counterpart terminal is fitted to a terminal housing chamber. The counterpart terminal is also connected to a wire or a wire harness, either directly or via another electrical connecting component and the like. The housing member enables, via the wire and the like thereof, a power supply (secondary battery) to supply power to at least one electronic device, with at least one electronic component interposed between the power supply and the electronic device. When an electronic component is provided in a vehicle such as an automobile, for example, the housing member is fixed to a vehicle structure in an engine compartment, a vehicle interior, and the like.

The housing member may be used alone or as a component to house at least one electronic component. The housing member may also be used as an assembly in which a plurality of the components are combined or used by assembling at least one of the components to a component which serves as a principal body (hereinafter, referred to as a principal component). When they are used in a vehicle, they are known as what is called electrical junction boxes. The electrical junction box houses at least one piece of electrical equipment therein. Known electrical equipment to be housed includes, in addition to the electronic component such as the relay and the fuse described above, a wire connector (relay connector and branching connector) and the like. An electronic controlling unit of a vehicle may also be housed in the electrical junction box. The electrical junction box may also be referred to as a relay box, a fuse box, a junction box, and the like.

In some electrical junction boxes, for example, at least one housing space for housing electrical equipment is provided in a frame serving as a principal component. To assemble the electronic component described above into the housing space, the frame serves as the housing member described above. Accordingly, in such case, the electronic component and the frame are the constituents of an electronic component unit. Other electrical junction boxes may include a frame serving as a principal component and at least one block fixed to a certain assembly location on the frame. At least one housing space for electrical equipment is provided on the block. To assemble the electronic component described above into the housing space, the block serves as the housing member described above. Consequently, in such case, the electronic component and the block are the constituents of an electronic component unit, and the electronic component unit is fixed to the frame. Other electrical junction boxes may also include at least one housing space for electrical equipment provided on the frame to which the block is attached. In such case, if the electronic component described above is assembled in the housing space, the frame also serves as the housing member described above with the block. Accordingly, an electronic component unit used as an assembly structure of an electronic component and a block, and an electronic component unit used as an assembly structure of an electronic component and a frame coexist in such electrical junction boxes. The block may also be a block to which at least one housing member described above is assembled.

A specific example of an electronic component unit according to the present embodiment will be described below.

Figure 1:
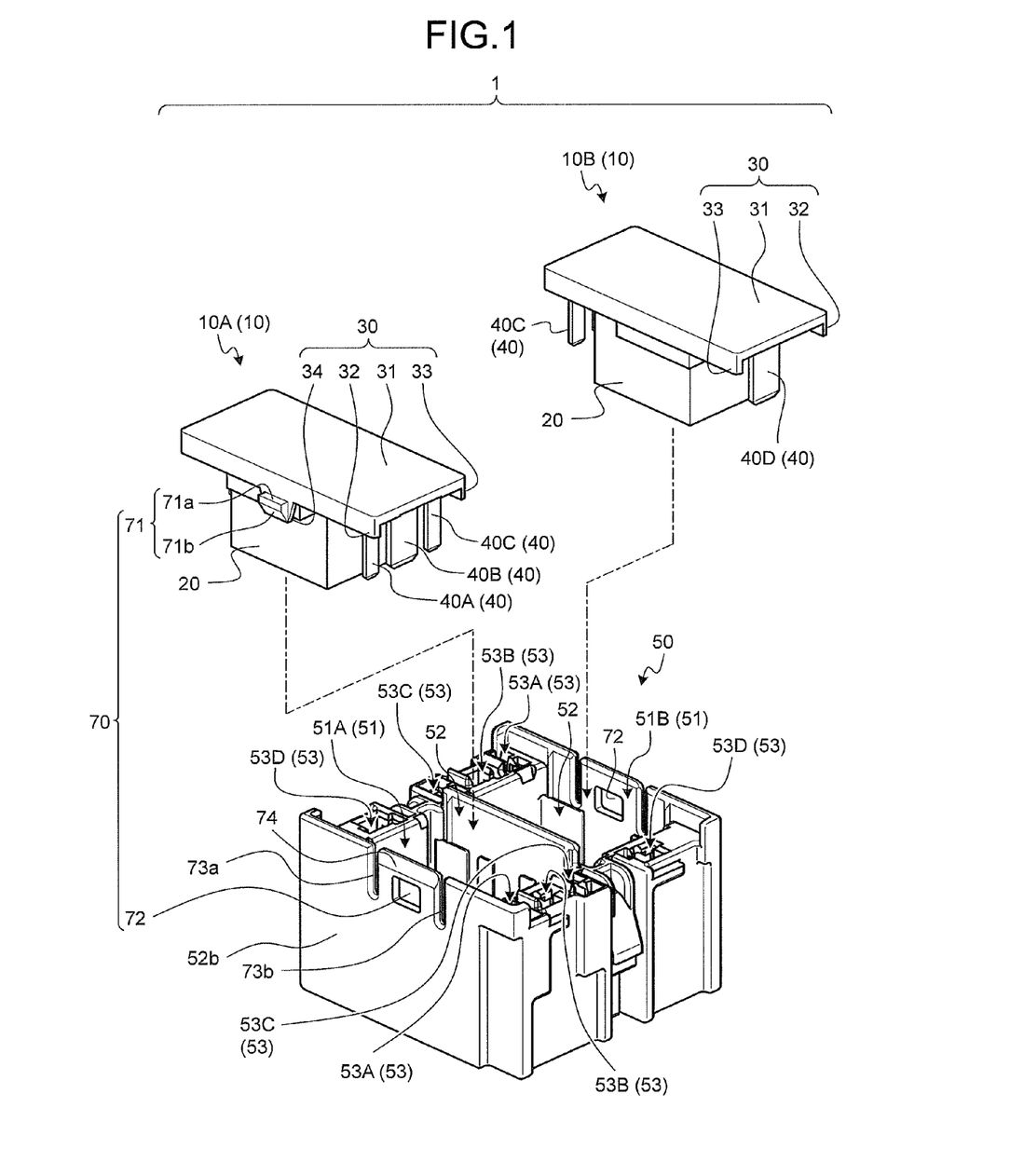
FIG. 1 is an exploded perspective view of an electronic component unit according to an embodiment of the present invention.
Figure 2:
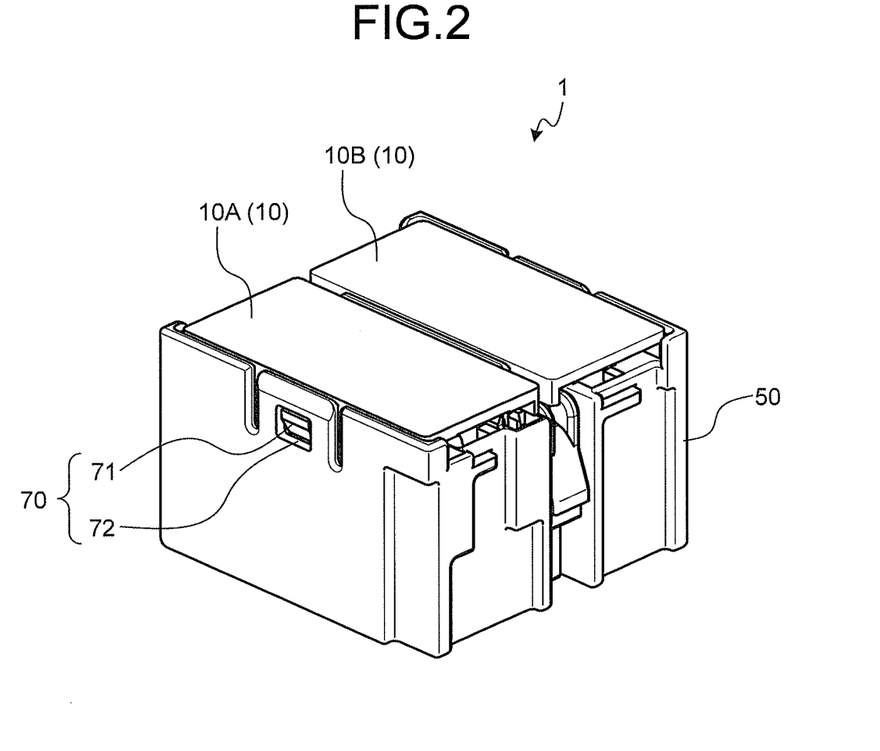
FIG. 2 is a perspective view of an electronic component unit according to the embodiment.
Figure 3:
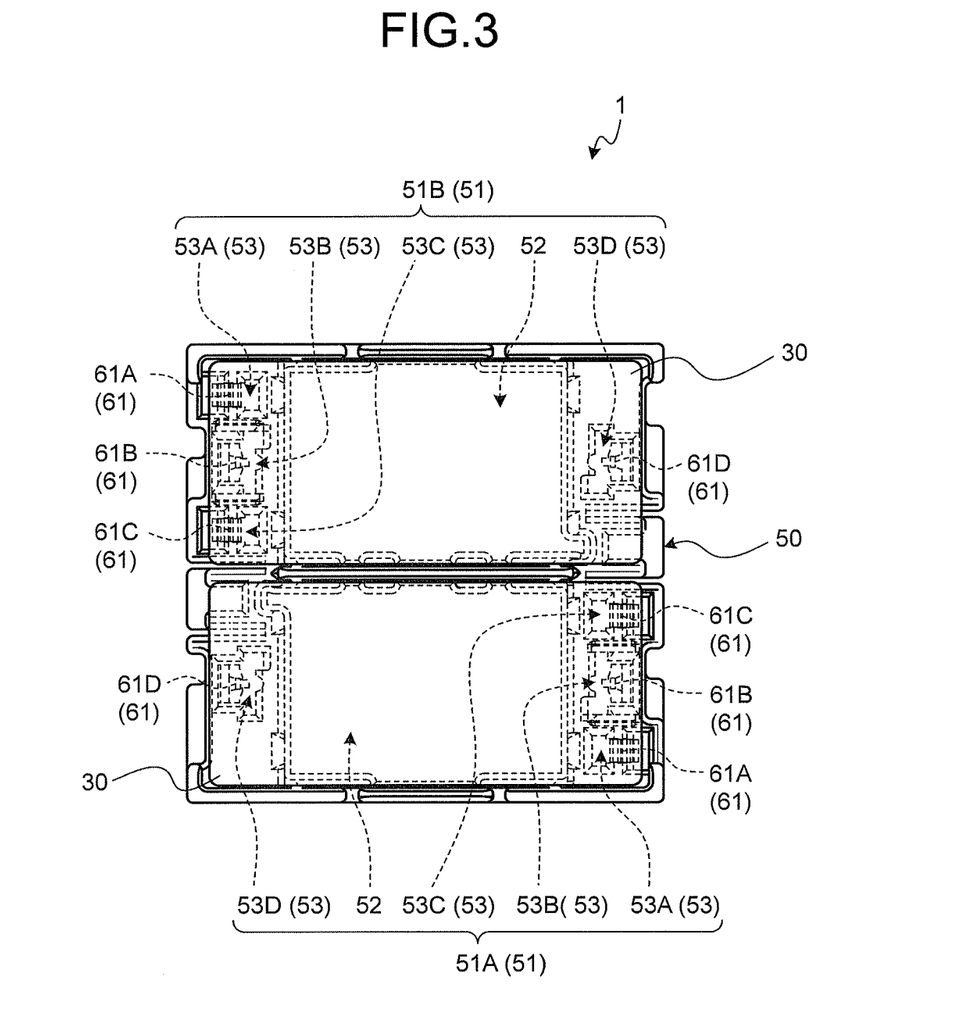
FIG. 3 is a partial perspective view of an electronic component unit according to the embodiment and a modification viewed from above.

The reference numeral 1 in FIGS. 1 to 3 indicates an electronic component unit according to the present embodiment. The reference numerals 10 and 50 in the diagrams respectively indicate an electronic component and a housing member according to the present embodiment. Here, a relay is used as an example of an electronic component 10.

Figure 4:
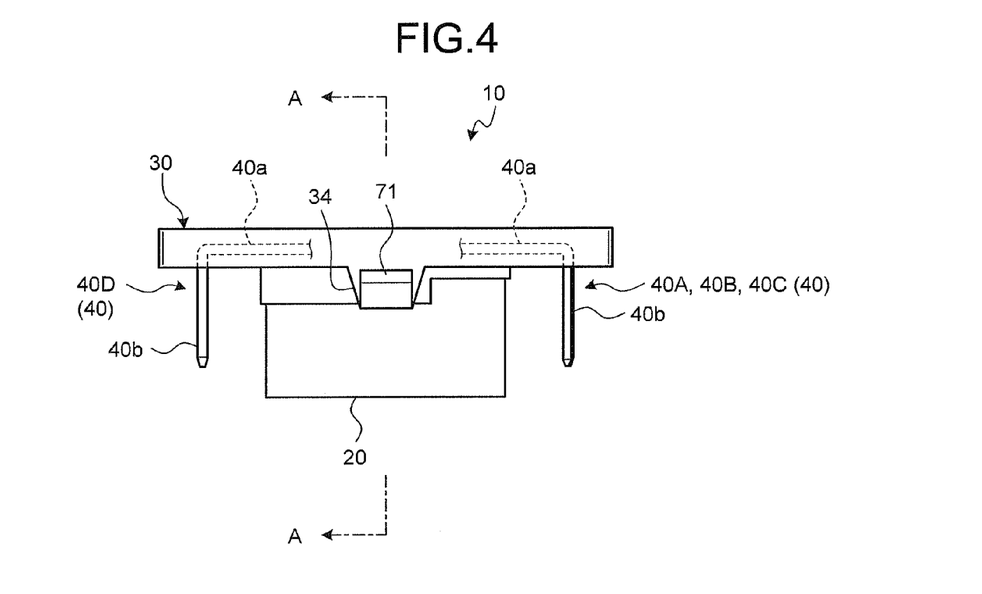
FIG. 4 is a front view of an electronic component according to the embodiment.
Figure 5:
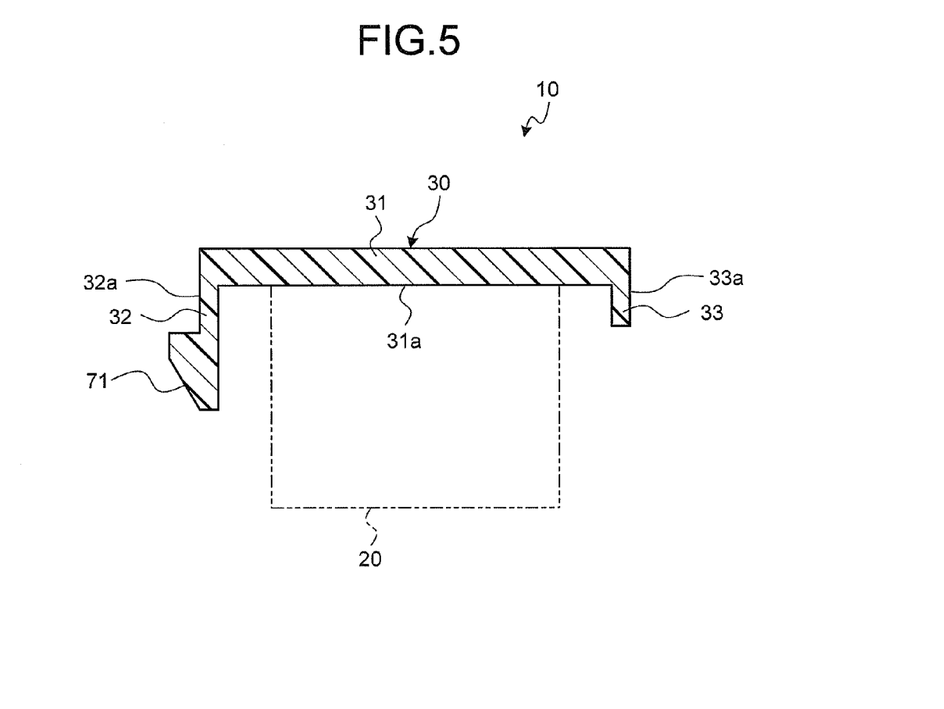
FIG. 5 is a sectional view cut along the line A-A in FIG. 4.

As illustrated in FIGS. 1 and 4, the electronic component 10 includes an electronic component main body 20, a holding member 30 that holds the electronic component main body 20 with the electronic component main body 20 exposed, and a terminal 40 electrically connected to the electronic component main body 20.

The electronic component main body 20 illustrated in the example is a relay main body and composed of various components such as a coil. The electronic component main body 20 in the diagrams is in a box shape, for the sake of illustration convenience.

The holding member 30 illustrated in the example includes a plate-like base 31 formed in a square shape or a rectangular shape. The electronic component main body 20 is, for example, attached to a plain surface 31a (FIG. 5), which is one of the two plain surfaces of the base 31. The base 31 covers an opening of a housing space 51, which will be described later, with the plain surface 31a. In other words, the base 31 is used as a lid to cover the opening. The holding member 30 is formed of an insulating polymer material such as a synthetic resin.

The holding member 30 includes a first wall 32 and a second wall 33 provided on a pair of two sides (two ends) facing each other, among the four sides (four ends) of the base 31. In the example, the first wall 32 and the second wall 33 are provided at each end of the two long sides of the base 31. Both the first wall 32 and the second wall 33 are vertically arranged toward the side where the electronic component main body 20 is disposed, when viewed from the base 31. The first wall 32 and the second wall 33 in the example are extended in the vertical direction of the plain surface 31a of the base 31. Accordingly, the section of the holding member 30 cut in the vertical direction as well as in the short side direction (one width direction) is formed in a U-shape. In the following, the long side direction may also be referred to as "another width direction".

The terminal 40 is an electrical connecting unit that electrically connects the electronic component main body 20 and a terminal 61 of the housing member 50, which will be described later. The terminal 40 is configured as a part of a metal bus bar electrically connected to the electronic component main body 20, and is a male terminal shaped into a plate. The terminal 40 is disposed so that it exists inside of a rectangular parallelepiped provided by projecting the plain surface 31a of the base 31 of the holding member 30 toward the direction perpendicular to the plain surface 31a, as well as in the direction toward the opening of the housing space 51. In other words, the terminal 40 is disposed inside of a virtual space provided by projecting the base 31 in the inserting direction of the electronic component 10 toward the housing space 51.

The terminal 40 includes a first extending unit 40a that extends along the plain surface 31a of the base 31, and a second extending unit 40b that extends toward the housing space 51 of the housing member 50 when the electronic component 10 is housed therein (FIG. 4). The first extending unit 40a extends in the long side direction (another width direction) along the plain surface 31a of the base 31 from the side of the electronic component main body 20. The second extending unit 40b starts from the end of the extending direction of the first extending unit 40a, and extends in the direction perpendicular to the plain surface 31a of the base 31. The extending direction of the second extending unit 40b is the inserting direction of the terminal 40 into the terminal (female terminal) 61. The inserting direction of the terminal 40 is the same as that of the electronic component 10 into the housing space 51.

The terminal 40 illustrated in the example is disposed on another pair of two sides (short sides) facing each other, on which the first wall 32 and the second wall 33 are not provided, when viewed from the holding member 30. Three terminals 40A, 40B, and 40C are disposed on one of the short sides as the terminal 40. The terminals 40A, 40B, and 40C are disposed in the short side direction so as to be spaced apart from each other. A terminal 40D is disposed on another short side as the terminal 40. The terminal 40D is disposed substantially at the center of the base 31 in the short side direction.

The housing member 50 is formed of an insulating polymer material such as a synthetic resin and includes the housing space 51 for the electronic component 10. The housing member 50 provides the housing space 51 for each electronic component 10. The housing member 50 in the example, as illustrated in FIG. 1, includes a housing space 51A for housing an electronic component 10A and a housing space 51B for housing an electronic component 10B. In the example, the electronic component 10A and the electronic component 10B are identical to each other. Thus, the housing space 51A and the housing space 51B are formed in the same shape and size, respectively. The housing space 51 (51A and 51B) includes a first housing chamber (first cavity) 52 used as a main body housing chamber for housing the electronic component main body 20, and a second housing chamber (second cavity) 53 used as a terminal housing chamber for housing the terminal 40 of the electronic component 10.

Figure 6:
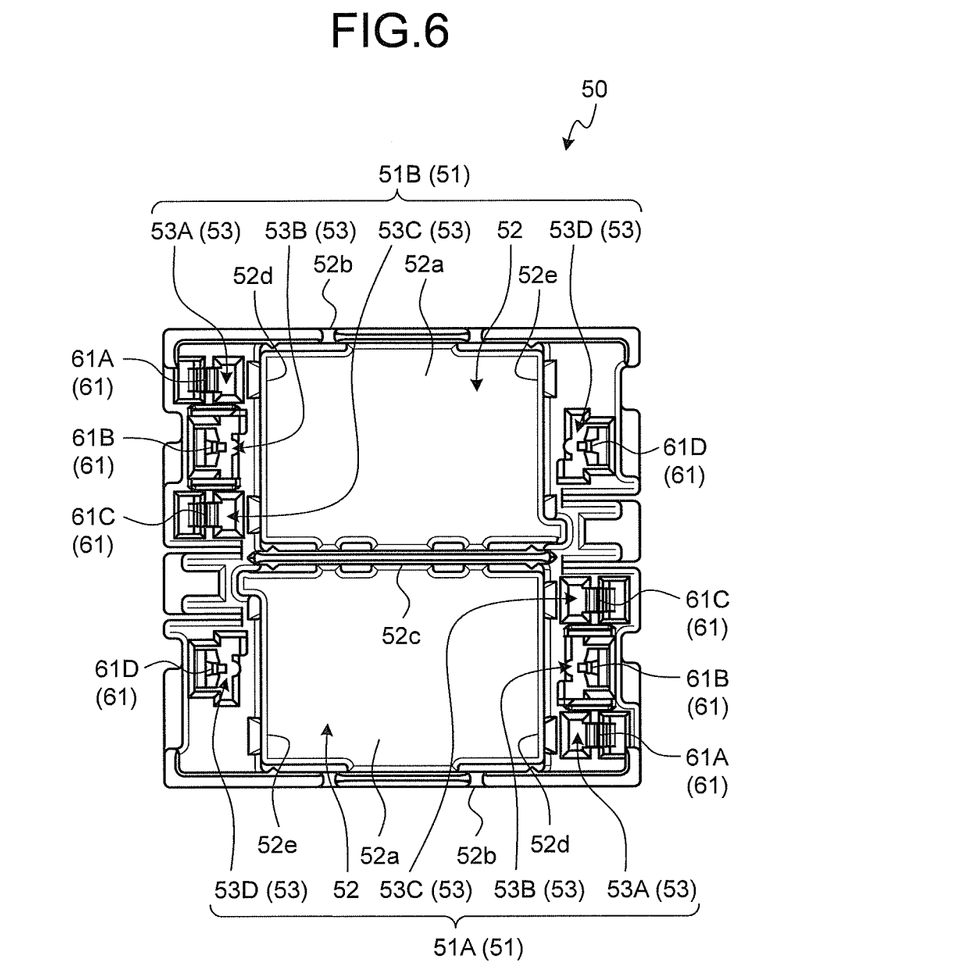
FIG. 6 is a top view of a housing member according to the embodiment and the modification.

The first housing chamber 52 is a space bigger than the exterior of the electronic component main body 20. The space, as illustrated in FIG. 6, is configured of a base 52a in a square shape or a rectangular shape, and walls 52b to 52e vertically arranged from the four sides of the base 52a, respectively. The first housing chamber 52 illustrated in the example includes the plate-shaped base 52a in a rectangular shape, and is a rectangular parallelepiped space that extends the walls 52b to 52e from the four sides of the base 52a in the vertical direction. In the first housing chamber 52, an opening is provided on respective ends of the walls 52b to 52e in the extending direction, and the opening is used as an inserting location at which the electronic component main body 20 is inserted. In the example, the wall 52c of the first housing chambers 52 is commonly used by the housing space 51A and 51B.

The wall surface at the side of the first housing chamber 52 of the wall 52b faces parallel to a wall surface 32a (FIG. 5) at the outside of the first wall 32 of the holding member 30, when the electronic component 10 is housed therein. Similarly, the wall surface at the side of the first housing chamber 52 of the wall 52c also faces parallel to a wall surface 33a (FIG. 5) at the outside of the second wall 33 of the holding member 30.

The second housing chamber 53 includes at least two openings and an inner space communicatively connected to each of the openings. The inner space houses the terminal 40 of the electronic component 10 therein. The inserting direction of the terminal 40 into the second housing chamber 53 is the same as that of the electronic component main body 20 into the first housing chamber 52. One of the two openings of the second housing chamber 53 is an inserting location at which the terminal 40 is inserted when the electronic component 10 is housed in the housing space 51.

The terminal 61 as an electrical connecting unit is fitted to the second housing chamber 53. The terminal 61 is a counterpart terminal electrically connected to the terminal 40 of the electronic component 10. The terminal 61 illustrated in the example is a female terminal into which the terminal 40 of the electronic component 10 is inserted. Although not illustrated, the terminal 61 is shaped into a spring with elasticity, for example, and can hold the inserted terminal 40 by the pressing force (contacting force) corresponding to the elasticity. A wire or a wire harness (not illustrated) is connected to the terminal 61, either directly or via another electrical connecting component and the like. The wire or the like is guided from another opening of the second housing chamber 53 to the outside of the second housing chamber 53.

The second housing chamber 53 is provided for each terminal 40 of the electronic component 10. In the example, the electronic component 10 is provided with four terminals 40A to 40D, and as illustrated in FIGS. 1 and 6, provided with four of second housing chambers 53A to 53D to house the respective terminals. The second housing chambers 53A to 53C are disposed outside of the wall 52d, when viewed from the first housing chamber 52. The second housing chamber 53D is disposed outside of the wall 52e, when viewed from the first housing chamber 52. Terminals 61A to 61D are fitted to the four of the second housing chambers 53A to 53D, respectively.

At least one lock mechanism 70 is provided between the electronic component 10 and the housing member 50 to maintain the secure housing state of the electronic component 10 with respect to the housing member 50 (FIGS. 1 and 2). The lock mechanism 70 includes a first engaging unit 71 provided on the holding member 30 and a second engaging unit 72 provided on the housing member 50. The housing state of the electronic component 10 with respect to the housing member 50 is maintained by engaging the first engaging unit 71 and the second engaging unit 72 with each other.

The first engaging unit 71 is provided on the wall surface 32a that is outside of the first wall 32. The second engaging unit 72 is provided on the wall surface that is inside of the wall 52b (the side of the first housing chamber 52) facing the wall surface 32a. The first wall 32 illustrated in the example has a projecting wall 34 projecting toward the inserting direction of the electronic component 10 with respect to the housing member 50, at the center portion in the long side direction (FIGS. 1 and 4). The first engaging unit 71 illustrated in the example is provided on the projecting wall 34. The first engaging unit 71 is a projecting unit projecting toward the wall surface that is inside of the wall 52b. The second engaging unit 72 is a hole or a recess into which the first engaging unit 71 is inserted. The second engaging unit 72 illustrated in the example is a hole in a square shape or a rectangular shape.

The rear end portion of the first engaging unit 71 in the inserting direction of the electronic component 10 into the housing member 50, is used as a locking unit 71a with respect to the second engaging unit 72 (FIG. 1). The locking unit 71a has a plain surface perpendicular to the inserting direction, and faces the wall surface and the like of the second engaging unit 72, when the first engaging unit 71 is inserted into the second engaging unit 72. Accordingly, even when the force in the direction disengaging from the housing member 50 is applied to the electronic component 10 housed in the housing member 50, the locking unit 71a is locked with the wall surface and the like of the second engaging unit 72. The lock mechanism 70 can thus prevent a deviation of the housing state between the electronic component 10 and the housing space 51.

The first engaging unit 71 also has an inclined surface 71b provided at the leading edge side in the inserting direction of the electronic component 10 into the housing member 50. The projecting amount of the inclined surface 71b gradually decreases toward the inserting direction. The wall 52b is provided with notches 73a and 73b, so that the second engaging unit 72 is inclined toward the direction separating from the first engaging unit 71 until the first engaging unit 71 is completely inserted into the second engaging unit 72. The notches 73a and 73b extend from the side of the opening of the housing space 51 toward the inserting direction of the electronic component 10. The second engaging unit 72 is disposed between the notches 73a and 73b. Accordingly, an inclined unit 74 surrounded by the notches 73a and 73b is inclined while being pressed and moved by the inclined surface 71b of the first engaging unit 71 with the second engaging unit 72, when the electronic component 10 is housed, and returns to the original position after the first engaging unit 71 is completely inserted into the second engaging unit 72. In this process, the projecting wall 34 on which the first engaging unit 71 is disposed also inclines in a direction opposite to the inclination direction of the inclined unit 74, and returns to the original position after the first engaging unit 71 is completely inserted into the second engaging unit 72. The inclined unit 74 and the projecting wall 34 are used to release the locking state of the lock mechanism 70. For example, by inclining the inclined unit 74 in the releasing direction, an operator can release the locking state of the locking unit 71a. An operator can also release the locking state of the locking unit 71a by pressing and moving the projecting wall 34 together with the first engaging unit 71 in the releasing direction.

Because this electronic component unit 1 is used under various environments, its installation locations also vary. Accordingly, when foreign matters such as liquid and dust exist around the electronic component unit 1, for example, a foreign matter may enter a connecting portion between the terminal 40 and the terminal 61. This may result in a contact failure between the terminals.

The electronic component unit 1 according to the present embodiment is configured to at least prevent a foreign matter from entering the connecting portion between the terminals.

More specifically, when viewed in the inserting direction of the electronic component 10, the connecting portion between the terminal 40 and the terminal 61, the terminal 40, and the terminal 61 are covered by the holding member 30, which is used as a lid for the housing space 51.

As described above, the terminal 40 is disposed inside of the virtual space provided by projecting the base 31 in the inserting direction of the electronic component 10 toward the housing space 51. The base 31 is used as a lid to cover the opening of the housing space 51 into which the electronic component 10 is inserted. Accordingly, in this electronic component unit 1, the base 31 covers the terminal 40 of the electronic component 10 and the connecting portion between the terminal 40 and the terminal 61 in the inserting direction of the electronic component 10. In other words, in this electronic component unit 1, the terminal 40 and the connecting portion between the terminal 40 and the terminal 61 are disposed in the virtual space described above configured by the base 31. Consequently, this electronic component unit 1 can prevent a foreign matter from entering the connecting portion between the terminal 40 and the terminal 61.

Moreover, in this example, it is preferable to extend both ends of the base 31 on the short side toward the long side direction, so that the base 31 can also cover the terminal 61 in the inserting direction of the electronic component 10. That is, in the electronic component unit 1, it is preferable to dispose not only the terminal 40 and the connecting portion between the terminal 40 and the terminal 61, but also the terminal 61 of the housing member 50 in the virtual space described above configured by the base 31. The electronic component unit 1 configured in this manner can further prevent a foreign matter from entering the connecting portion between the terminal 40 and the terminal 61.

In the electronic component unit 1 illustrated in the example, the electronic component main body 20 is attached to the holding member 30 with the electronic component main body 20 exposed. However, in this electronic component unit 1, the base 31 also covers the electronic component main body 20 in the inserting direction of the electronic component 10. That is, in this electronic component unit 1, the electronic component main body 20 is disposed in the virtual space described above configured by the base 31. Accordingly, this electronic component unit 1 can also prevent a foreign matter from entering the electronic component main body 20.

As described above, the electronic component unit 1 according to the present embodiment can prevent a foreign matter from entering the connecting portion between the terminal 40 and the terminal 61, and into the electronic component main body 20. Consequently, this electronic component unit 1 can prevent an inconvenience such as a contact failure from occurring between the terminals and in the electronic component main body 20.

Modification

Figure 7:
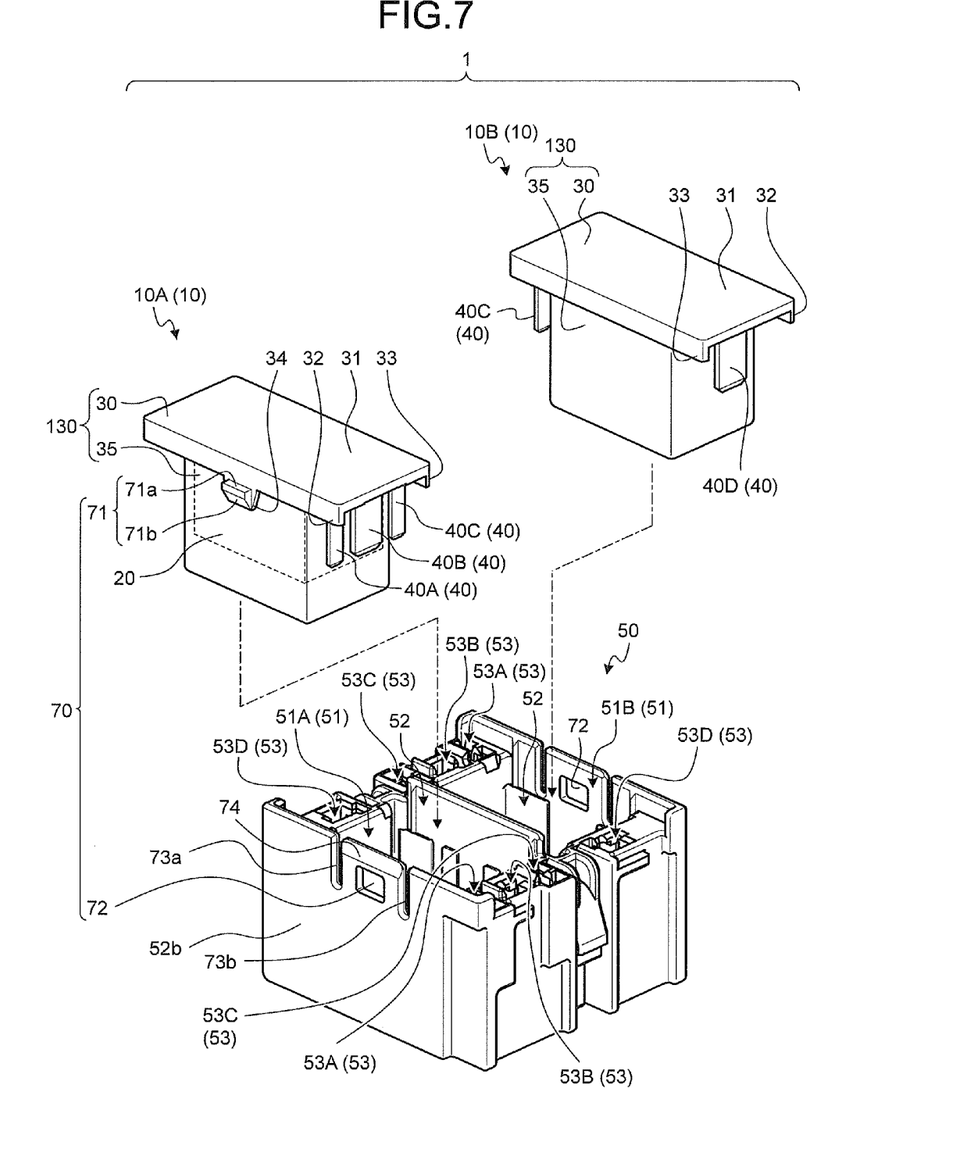
FIG. 7 is an exploded perspective view of an electronic component unit according to the modification.

In the embodiment described above, the electronic component main body 20 is attached to the holding member 30 with the electronic component main body 20 exposed. In the electronic component unit 1 according to the present modification, to further prevent a foreign matter from entering the electronic component main body 20, as illustrated in FIG. 7, the electronic component 10 is housed in the housing space 51 after the electronic component main body 20 is stored in a case 130. In other words, the electronic component unit 1 according to the present modification is the electronic component unit 1 according to the embodiment that is provided with the case 130.

The case 130 includes the same holding member 30 as in the embodiment, and a case member 35.

Figure 8:
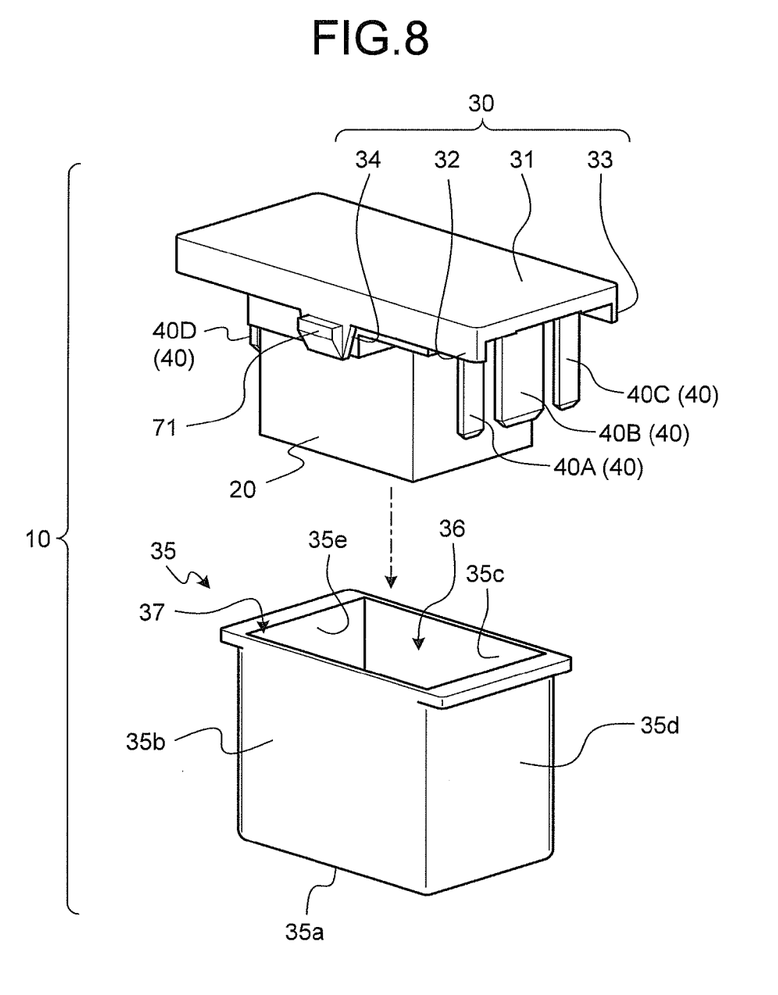
FIG. 8 is a perspective view of an electronic component unit according to the modification.

The case member 35, as illustrated in FIG. 8, includes a housing chamber 36 that houses the electronic component main body 20 with the terminal 40 exposed, and constitutes the case 130 together with the holding member 30 by assembling to the holding member 30. The case member 35 is formed of an insulating polymer material such as a synthetic resin.

The case member 35 includes a base 35a in a square shape or a rectangular shape, and walls 35b to 35e vertically arranged from the four sides of the base 35a, respectively. In the case member 35, an inner space surrounded by the base 35a and the walls 35b to 35e is used as the housing chamber 36 that houses the electronic component main body 20. An opening 37 in a square shape or a rectangular shape is provided in the case member 35, and the opening 37 is used as an inserting location at which the electronic component main body 20 is inserted into the housing chamber 36. The case member 35 illustrated in the example includes the plate-like base 35a formed in a rectangular shape, and is a rectangular parallelepiped box with the walls 35b to 35e extending from the four sides of the base 35a in the vertical direction. Accordingly, the opening 37 is formed in a rectangular shape by the respective ends of the walls 35b to 35e in the extending direction.

The wall 35b at the long side is interposed between the electronic component main body 20 and the first wall 32 of the holding member 30. The wall 35c at the long side is interposed between the electronic component main body 20 and the second wall 33 of the holding member 30. The wall 35d on the short side is interposed between the electronic component main body 20 and the second extending unit 40b of the terminals 40A, 40B and, 40C. The first extending unit 40a of the terminals 40A, 403, and 40C is interposed between the end of the wall 35d in the extending direction and the base 31 of the holding member 30. The wall 35e on the short side is interposed between the electronic component main body 20 and the second extending unit 40b of the terminal 40D. The first extending unit 40a of the terminal 40D is interposed between the end of the wall 35e in the extending direction and the base 31.

When the case member 35 is assembled with the holding member 30, they are fixed with a locking mechanism (not illustrated). The locking mechanism is configured of locking units (such as a clip and a groove) each provided between the case member 35 and the holding member 30.

The electronic component 10 in which the electronic component main body 20 is housed in the case 130, is housed in the housing space 51 of the housing member 50, as in the embodiment. The electronic component main body 20 is housed in the first housing chamber 52 together with the case member 35.

In the electronic component unit 1 according to the present modification configured in this manner, the base 31 covers the terminal 40 of the electronic component 10 and the connecting portion between the terminal 40 and the terminal 61 in the inserting direction of the electronic component 10. In other words, in this electronic component unit 1, the terminal 40 and the connecting portion between the terminal 40 and the terminal 61 are disposed in the virtual space described above configured by the base 31. As a result, as in the embodiment, this electronic component unit 1 can prevent a foreign matter from entering the connecting portion between the terminal 40 and the terminal 61.

The electronic component unit 1 according to the present modification, as in the embodiment, may extend both ends of the base 31 on the short side, so that the base 31 can also cover the terminal 61 in the inserting direction of the electronic component 10. In other words, in this electronic component unit 1, not only the terminal 40 and the connecting portion between the terminal 40 and the terminal 61, but also the terminal 61 of the housing member 50 may be disposed in the virtual space described above configured by the base 31. The electronic component unit 1 configured in this manner can further prevent a foreign matter from entering the connecting portion between the terminal 40 and the terminal 61.

The electronic component unit 1 according to the present modification also houses the electronic component main body 20 in the case 130. Accordingly, it is also possible to further prevent a foreign matter from entering the electronic component main body 20.

As described above, the electronic component unit 1 according to the present modification, as in the embodiment, can prevent a foreign matter from entering the connecting portion between the terminal 40 and the terminal 61. Accordingly, it is possible to prevent an inconvenience such as a contact failure from occurring between the terminals. Moreover, because this electronic component unit 1 further prevents a foreign matter from entering the electronic component main body 20, it can prevent an inconvenience such as a contact failure from occurring in the electronic component main body 20 better than the embodiment.

Although not illustrated, it is preferable to use the electronic component unit 1 according to the embodiment and the modification described above by housing it inside of a waterproof case (such as a highly airtight case). By doing so, this electronic component unit 1 can further prevent a foreign matter from entering therein.

In an electronic component unit according to the present invention, a connecting portion between a terminal and a counterpart terminal is covered by a base of a holding member, when viewed in the inserting direction of an electronic component into a housing space. This enables the electronic component unit to prevent a foreign matter from entering the connecting portion.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic component unit, comprising;
    an electronic component including an electronic component main body, a holding member having a plate-shaped base which holds the electronic component main body, and a terminal which is electrically connected to the electronic component main body;
    a housing member including a housing space of the electronic component, the housing space having a main body housing chamber which houses the electronic component main body and a terminal housing chamber which houses a terminal of the electronic component; and
    a counterpart terminal which is fitted to the terminal housing chamber, and is electrically connected to the terminal when the electronic component is housed in the housing space, wherein
    the terminal is disposed inside of a virtual space provided by projecting the base in an inserting direction of the electronic component toward the housing space, and
    the base is used as a lid to cover an opening of the housing space into which the electronic component is inserted.

2. The electronic component unit according to claim 1, wherein
    the base covers a connecting portion between the terminal and the counterpart terminal as well as the counterpart terminal, when viewed in the inserting direction.

3. The electronic component unit according to claim 2, wherein the base holds the electronic component main body inside of the virtual space with the electronic component main body exposed.

4. The electronic component unit according to claim 2, wherein the electronic component includes a housing chamber which houses the electronic component main body with the terminal exposed, and a casing member which constitutes a case together with the holding member by assembling the casing member to the holding member.

5. The electronic component unit according to claim 1, wherein the base holds the electronic component main body inside of the virtual space with the electronic component main body exposed.

6. The electronic component unit according to claim 1, wherein the electronic component includes a housing chamber which houses the electronic component main body with the terminal exposed, and a casing member which constitutes a case together with the holding member by assembling the casing member to the holding member.

\* \* \* \* \*